Jan. 15, 1935. G. BRAIN 1,988,234
CLOSET BOWL
Filed Nov. 11, 1932
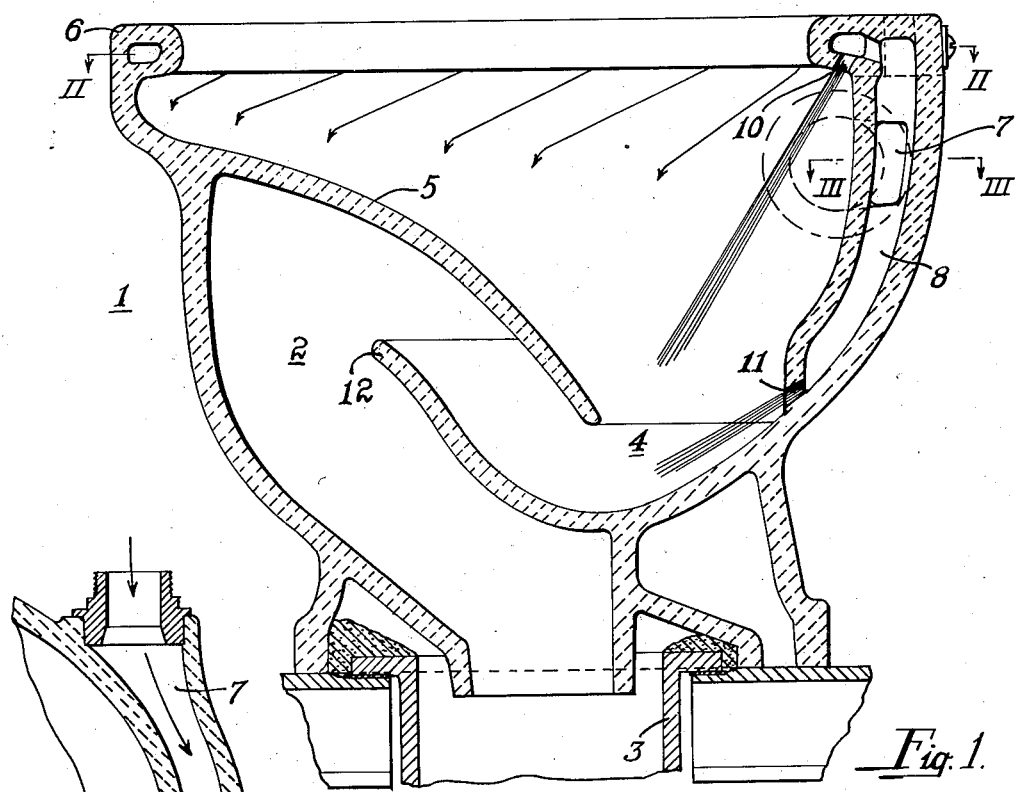
Fig. 1.
Fig. 3.
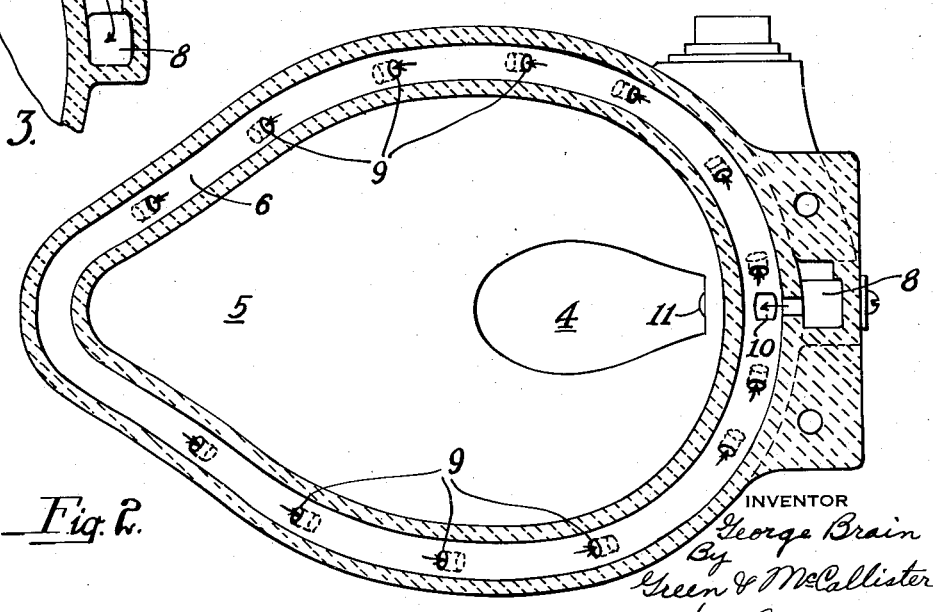
Fig. 2.
INVENTOR
George Brain
By
Green & McCallister
His Attorneys Patented Jan. 15, 1935

1,988,234

UNITED STATES PATENT OFFICE 1,988,234

CLOSET BOWL

George Brain, Tiffin, Ohio, assignor to Standard Sanitary Manufacturing Company, a corporation of New Jersey Application November 11, 1932, Serial No. 642,236

2 Claims. (Cl. 4—73)

This invention relates to water closet bowls, and in particular to improvements in closet bowls which will provide improved flushing action.

One object of this invention is to provide a closet bowl of the siphonic or blowout action type in which an efficient flushing action is obtained with a small volume of water.

Another object is to provide a water closet bowl in which the flushing action is accomplished with a limited supply of water delivered to the bowl under sufficiently high velocity to effect a blowout action.

A further object is to provide a closet bowl in which the flushing water is directed into the bowl in such a way and under such velocity that the streams of water act as water guns for submerging and pushing the fecal content over the weir of the bowl.

A still further object is the provision of a closet bowl that shall be simple in construction and suitable for use where a limited water supply only is available such as in Pullman cars and the like.

These and other objects which will hereinafter be made apparent to those skilled in this particular art are accomplished by means of this invention, one embodiment of which is described in the following specification and illustrated in the accompanying drawing, wherein:

Figure 1 is a view in vertical section of my improved water closet bowl;

Fig. 2 is a view in section taken on lines II—II of Fig. 1; and

Fig. 3 is a section taken on lines III—III of Fig. 1, showing the shape of the water inlet passage leading to the bowl.

The method of flushing closet bowls, in accordance with this invention, is accomplished by directing a jet of water to the bowl directly into the trap thereof and at such an angle that it strikes the fecal content and with sufficient velocity to submerge it below the water line in the trap into the path of a jet of water entering the trap at a point slightly below the water line with sufficient velocity to force the fecal content into the up-leg of the siphon and over the weir of the bowl so that it is carried into the soil line.

In order that the bowl will function properly on a small amount of water, the stream of water directed downwardly into the trap which submerges the fecal content, and the stream of water which starts the siphonic or blowout action of the bowl must be under relatively high velocities. These velocities are attained by gradually decreasing the area of the water passageway leading from the supply line to the jets which direct the water into the trap so that the speed of the water will be increased without increasing the pressure of the water supply.

Referring to the drawing, a closet bowl made in accordance with my invention is designated in its entirety as 1. The bowl is of the siphonic or blowout action type and has a siphon 2 formed therein with the down-leg thereof connected to a soil pipe 3 and the up-leg terminating in a trap 4 formed at the bottom of a pan 5, leading from the trap to a flushing rim 6 around the top of the bowl.

The water for flushing the bowl is introduced into the bowl through a passageway 7, connected to a suitable water supply line (not shown), into an inlet chamber 8 formed at the rear of the bowl. The inlet chamber 8 is connected to the flushing rim 6 which is provided with a series of spaced openings 9 in the bottom thereof through which water is directed over the pan 5. So that the pan 5 will be washed with a minimum amount of water, the openings 9 extend through the flushing rim at an angle to the vertical axis of the bowl and are so spaced that water will be directed to all parts of the pan and wash the fecal content into the trap 4.

In order to discharge the fecal content from the trap 4 with a small volume of water, the flushing rim 6 is further provided with a jet 10 which extends through the flush rim at such an angle that a stream of water is directed into the trap so that it strikes the fecal content therein and forces it below the water line where it is struck by a stream of water introduced into the trap below the water line through a jet opening 11 connecting the trap to the inlet chamber 8. This stream of water entering the trap 4 through the jet 11 strikes the fecal content and pushes it into the up-leg of the siphon and over the weir 12 into the down-leg of the siphon which carries it into a soil line 3.

To secure jets of water issuing from the openings 10 and 11 with sufficient velocity to submerge the fecal content in the trap and to push or force the submerged content over the weir, the passageway 7 leading from the source of water supply is of gradually reducing area whereby the velocity of the water entering the inlet chamber 8 is increased to such an extent that the bowl is made to operate on a very small amount of water.

The stream or jet of water introduced into the trap 4 through the jet 11 performs a double function of pushing the fecal content over the weir and also starting a siphonic action in the bowl.

In the flushing operation, the pan of the bowl is washed very effectively with water at low velocity which washes the fecal content into the water area of the trap where it is struck by a stream of water at high velocity so that the fecal content is submerged below the water line into the path of a second stream of water at high velocity which expels the fecal content from the bowl. The jets 10 and 11 act as water guns, one of which hits the contents of the bowl and pushes it below the surface of the water into the range of the other stream which expels it from the bowl.

From the foregoing it is apparent that I have constructed a closet bowl in which the flushing action, due to the high velocity and direction of the jets of water, is accomplished with a very small amount of water, less than one gallon, which is especially adapted for use where only a limited quantity of water is available such as in Pullman cars and the like.

While I have described one modification of my invention, it is apparent that certain changes, omissions and substitutions may be made therein without departing either from the spirit of the invention or the scope of the appended claims.

What I claim as new and desire to secure by Letters Patent is:

1. A water closet bowl having a trap and a siphon connecting said trap to a soil line, a hollow flushing rim around the top of said bowl having a series of inclined openings extending through the bottom thereof, each of said openings having the same inclination and sloping in the same direction, for swirling water over the pan of the bowl to collect the fecal matter in said trap and a jet for directing a heavy stream of water directly into said trap to submerge the collected fecal matter, and means for introducing a stream of water into said trap below the normal water level for carrying said submerged fecal matter through the upleg of the siphon and starting siphonic action in said bowl.

2. A water closet bowl having a trap and a siphon connecting said trap to a soil line, a hollow flushing rim around the top of said bowl having a series of inclined openings extending through the bottom thereof, each of said openings having the same inclination and sloping in the same direction, for causing the water to travel in a spiral path over the pan of the bowl and collect the fecal matter in said trap and a jet for directing a heavy stream of water directly into said trap to submerge the collected fecal matter, and a water inlet chamber connected to said rim and having a jet opening into said trap slightly below the water level thereof to direct a stream of water into said trap and force the submerged fecal matter through the upleg of the siphon and start siphonic action in said bowl.

GEORGE BRAIN.